US009876937B1

(12) United States Patent
Subbaian et al.

(10) Patent No.: US 9,876,937 B1
(45) Date of Patent: Jan. 23, 2018

(54) SAVING MARKING MATERIAL USING THRESHOLD ARRAYS AND TONER REDUCTION MASK (71) Applicant: Xerox Corporation, Norwalk, CT (US)

(72) Inventors: Sudhagar Subbaian, Coimbatore (IN); Sainarayanan Gopalakrishnan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/470,322

(22) Filed: Mar. 27, 2017

(51) Int. Cl.
H04N 1/405 (2006.01)
H04N 1/52 (2006.01)
H04N 1/409 (2006.01)
G06F 3/12 (2006.01)

(52) U.S. Cl.
CPC ............ *H04N 1/405* (2013.01); *G06F 3/1219* (2013.01); *G06F 3/1229* (2013.01); *H04N 1/4092* (2013.01); *H04N 1/52* (2013.01); *H04N 2201/0094* (2013.01)

(58) Field of Classification Search
CPC ...... H04N 1/405; H04N 1/409; H04N 1/4092; H04N 1/52; H04N 2201/0094; G06F 3/1219; G06F 3/1229
See application file for complete search history.

(56) References Cited

U.S. PATENT DOCUMENTS

| 5,646,670 | A | 7/1997 | Seto et al. |
| 5,946,450 | A | 8/1999 | Ebner et al. |
| 6,313,925 | B1 | 11/2001 | Decker et al. |
| 6,829,064 | B1 | 12/2004 | Yu et al. |
| 8,797,601 | B2 | 8/2014 | Yao |
| 8,958,119 | B2 | 2/2015 | Kawaguchi |
| 9,542,130 | B2 | 1/2017 | Subbaian et al. |
| 2007/0109336 | A1 | 5/2007 | Ng |
| 2008/0170246 | A1 | 7/2008 | Patton et al. |

*Primary Examiner* — Christopher D Wait
(74) *Attorney, Agent, or Firm* — Gibb & Riley, LLC (57) ABSTRACT Methods and devices create a first halftone image and a different second halftone image from a continuous tone image. A third halftone image is produced by identifying pixels that are common to both the first and second halftone images. A toner reduction mask is applied to the third halftone image to produce a fourth halftone image (the fourth halftone image has only holes and remaining ones of the common pixels). The holes are added to the first halftone image to create a reduced-toner halftone image. Further, edges of features within the continuous tone image are detected (to identify edge pixels of the edge features) and such edge pixels are added to the reduced-toner halftone image to produce a print-ready halftone image. Finally, such methods print the print-ready halftone image on print media.

20 Claims, 5 Drawing Sheets

SAVING MARKING MATERIAL USING THRESHOLD ARRAYS AND TONER REDUCTION MASK

BACKGROUND

Devices and methods herein generally relate to reducing the amount of marking material used in printing, and more particularly to achieving such reductions using threshold arrays and a toner reduction mask.

Reducing the usage of toner in printers, especially in color printers, increases toner yield. Some systems for reducing toner usage decrease the halftone frequency (which decreases image quality), adjust the tone reproduction curve (TRC) (which decreases contrast and image quality), use neighborhood processing to decide which pixel are to be turned on/off (which increases processing complexity), optimize print engine and image output terminal (IOT) components for better toner yields, etc. Additionally, some methods affect only the darker regions of images, which can prevent toner savings from being as high as expected.

Such toner saver methods can have a significant effect on image quality, and present a tradeoff between image quality and toner savings. The goal of such systems is to identify methods that will give greater toner savings, without sacrificing quality image.

SUMMARY

Exemplary methods herein create a first halftone image by applying a first threshold array to a continuous tone image using an image processor, and simultaneously create a second halftone image by applying a second threshold array to the continuous tone image using the image processor. The first threshold array is different from the second threshold array, and the second threshold array can comprise an inverted form of the first threshold array (e.g., a horizontally or vertically flipped version of the first threshold array).

Additionally, such methods produce a third halftone image using the image processor by identifying common printing pixels that are common to both the first halftone image and the second halftone image, and including only the common pixels in the third halftone image. These methods then apply a toner reduction mask to the third halftone image (e.g., by removing a portion of the common pixels from the third halftone image according to the methodology of the toner reduction mask) to produce a fourth halftone image (again, using the image processor). The fourth halftone image has only non-printing pixels (e.g., "holes") and remaining ones of the common pixels left by the toner reduction mask.

Then such methods substitute the non-printing pixels for printing pixels in the first halftone image (e.g., add the holes to the first halftone image) to create a reduced-toner halftone image (using the image processor). Further, the methods simultaneously detect edges of features within the continuous tone image (to identify edge pixels of the edge features using the image processor) and add such edge pixels to the reduced-toner halftone image to produce a print-ready halftone image using an image processor. The non-printing pixels (holes) are not substituted for the edge pixels, so the edge pixels remain unaffected and unaltered in the print-ready halftone image. Finally, such methods print the print-ready halftone image on print media using a printing device.

Various printing devices herein include (among other components) an input receiving a continuous tone image, an image processor electrically connected to the input, a printing engine electrically connected to the image processor, etc. The image processor creates a first halftone image by applying a first threshold array to the continuous tone image, and simultaneously creates a second halftone image by applying a second threshold array to the continuous tone image. The first threshold array is different from the second threshold array, and the second threshold array can comprise an inverted form of the first threshold array (e.g., a horizontally or vertically flipped version of the first threshold array).

The image processor also produces a third halftone image by identifying common printing pixels that are common to both the first halftone image and the second halftone image, and including only the common pixels in the third halftone image. The image processor then applies a toner reduction mask to the third halftone image to remove a portion of the common pixels from the third halftone image to produce a fourth halftone image using the image processor. The fourth halftone image has only non-printing pixels (holes) and remaining ones of the common pixels left by the toner reduction mask.

The image processor also substitutes the non-printing pixels (holes) for printing pixels in the first halftone image to create a reduced-toner halftone image. Simultaneously, the image processor detects edges of features within the continuous tone image to identify edge pixels of the edge features. The image processor then adds the edge pixels to the reduced-toner halftone image to produce a print-ready halftone image. Note that the non-printing pixels (holes) are not substituted for the edge pixels during the substituting. Finally, the printing engine prints the print-ready halftone image on print media.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, toner saver methods can have a significant effect on image quality, and there is always a tradeoff between image quality and toner savings in conventional systems. The devices and methods described herein provide more toner saving, with minimal decrease in image quality.

Certain types of images can suffer greater from losses in image quality than others when engaging in toner saving operations. For example, engineering drawing and images having very thin lines can see much larger decreases in image quality during toner reduction processes. In view of this, the devices and methods disclosed herein give more importance to retaining edge information. More specifically, this disclosure preserves the image quality for thin lines, small text and drawings, because the devices and methods herein maintain edge information, while providing toner savings for other object types.

Therefore, these devices and methods reduce toner usage while preserving crisp sharp edges, work well across all gray levels from light to dark regions (reduce tone in all regions irrespective of gray levels), and maintain good contrast in images. Indeed, these systems save toner across the whole range of input gray, while some previous methods were limited to dark regions. Further, the methods and devices herein allow a white hole mask to be altered to achieve a desired amount of savings.

The devices and methods herein are designed to address graphic objects, but also provide toner saving in other object types. The devices and methods herein do not require any segmentation or classification to differentiate different objects. More specifically, the devices and methods herein identify the common pixels between two screens, and a mask is applied on the common pixels to reduce the toner usage. Then the residual image is replaced in the original halftoned image.

This device and method is robust enough to avoid issues in highlighted regions, and will not affect the low tone region drastically, because the number of common pixels between two screens is lesser in low tone region compared to high tone regions. More specifically, the number of pixels in lower tone level regions is always lower compared to higher toner level regions; hence, the common pixels are also lower in low tone regions.

In one example, methods herein process an original image Y1 into a halftoned image T1, invert the halftoned image T1 into a halftone image T2 (e.g., by horizontally or vertically flipping the threshold array), and find common pixels between T1 and T2. Here, let T=T1 and T2, and let idx be the index of white pixels in T. Next, these methods create (or use a predefined) mask Z (e.g., such as a checker box mask). The mask Z is applied on T, and the resultant is X. In the next step, these methods find the edges in the original contone image Y1 (simple edge detection methods can be used, such as those that apply edge detection in contone grayscale images). Here, let edge image be E. Then these methods replace/add the pixels from E at index idx in X (e.g., X(idx)=E(idx)+X(idx)).

Figure 1:
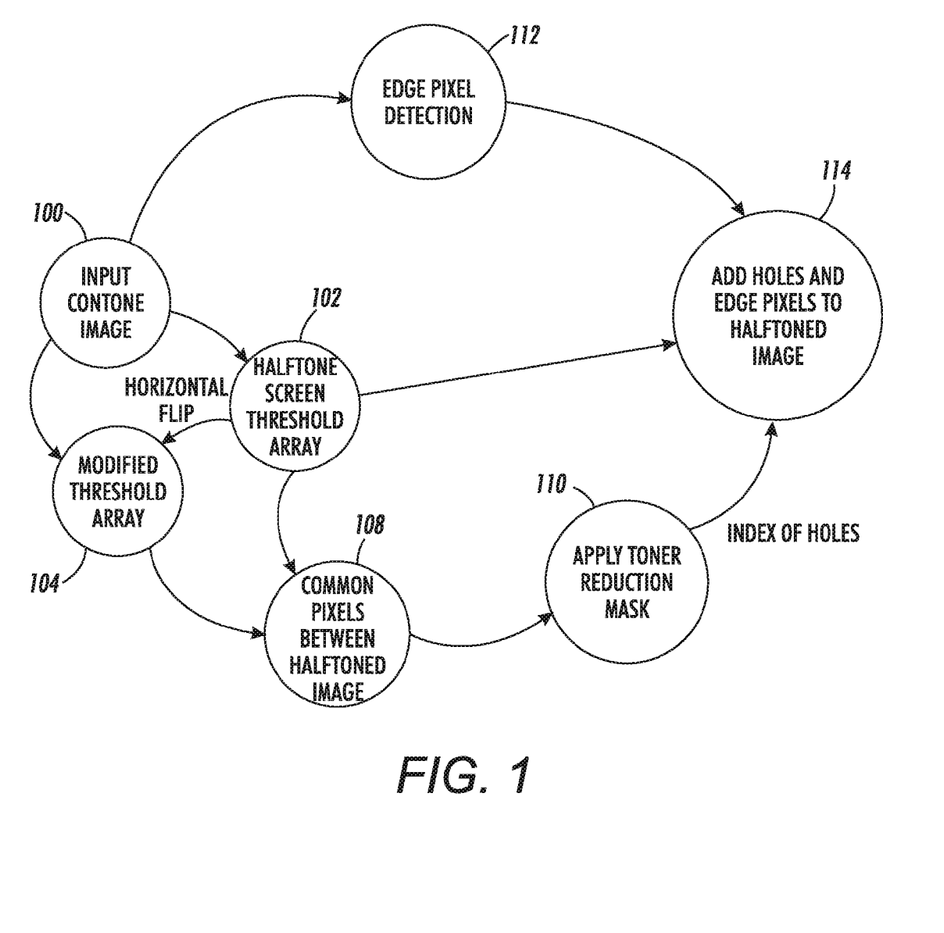
FIG. 1 is a flow diagram of various methods herein.

FIG. 1 is flow diagram illustrating some features of exemplary methods herein. In item 100, a continuous tone (contone) image is input. A first halftone image is created by applying a first threshold array 102 to the continuous tone image 100, and simultaneously a second halftone image by applying a second threshold array 104 to the continuous tone image 100. The first threshold array 102 is different from the second threshold array 104 and, for example, the second threshold array 104 can comprise an inverted form of the first threshold array 102 (e.g., a horizontally or vertically flipped version of the first threshold array 102). With flipped arrays, the location of the threshold is altered, either horizontally or vertically.

Additionally, such methods produce a third halftone image by identifying common printing pixels 108 that are common to both the first halftone image and the second halftone image, and keeping only the common pixels in the third halftone image. These methods then apply a toner reduction mask 110 to the third halftone image (e.g., by removing a portion of the common pixels from the third halftone image according to the methodology of the toner reduction mask) to produce a fourth halftone image (again, using the image processor). The fourth halftone image has only non-printing pixels (e.g., "holes") and remaining ones of the common pixels left by the toner reduction mask. Then, such methods substitute the non-printing pixels for printing pixels in the first halftone image (e.g., add the holes to the first halftone image) to create a reduced-toner halftone image 114 (using the image processor).

Simultaneously with the previous processing, the methods detect edges of features within the continuous tone image (to identify edge pixels 112 of the edge features using the image processor) and add such edge pixels to the reduced-toner halftone image 114 to produce a print-ready halftone image using an image processor. The non-printing pixels (holes) from item 110 are not substituted for the edge pixels, so the edge pixels remain unaffected and unaltered in the print-ready halftone image, and so that the edge features remain clear and vibrant despite the toner reduction processing. Finally, such methods print the print-ready halftone image on print media using a printing device.

Figure 2:
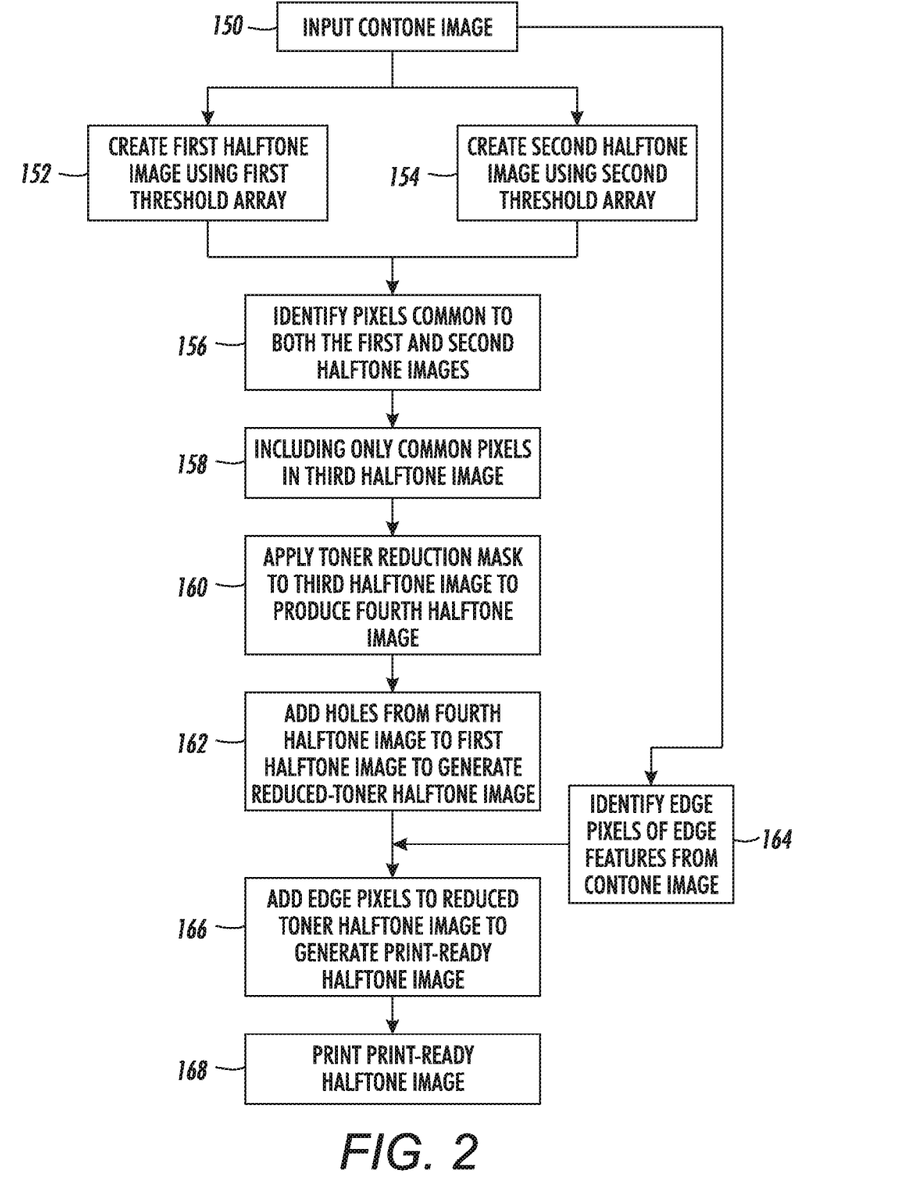
FIG. 2 is a flow diagram of various methods herein.

FIG. 2 is a flowchart that is similar to FIG. 1, but illustrates some of the steps performed with methods herein. In item 150 in FIG. 2, a continuous tone (contone) image is input by being scanned, or electronically received, by a printing device. In item 152, these methods create a first halftone image by applying a first threshold array to the continuous tone image using an image processor. Potentially simultaneously, in item 154, such methods create a second halftone image by applying a second threshold array to the continuous tone image using the image processor. The first threshold array is different from the second threshold array, and the second threshold array can comprise an inverted form of the first threshold array (e.g., a horizontally or vertically flipped version of the first threshold array).

Additionally, in item 156, such methods identify common printing pixels that are common to both the first halftone image and the second halftone image. In item 158, the methods herein produce a third halftone image using the image processor by including only the common pixels in the third halftone image. In item 160, these methods then apply a toner reduction mask to the third halftone image (e.g., by removing a portion of the common pixels from the third halftone image according to the methodology of the toner reduction mask) to produce a fourth halftone image (again, using the image processor). The fourth halftone image produced in item 160 has only non-printing pixels (e.g., "holes") and remaining ones of the common pixels left by the toner reduction mask.

Then, in item 162, such methods substitute the non-printing pixels from the fourth halftone mask in place of corresponding printing pixels in the first halftone image (e.g., "adds holes" to the first halftone image) to create a reduced-toner halftone image (using the image processor).

Potentially simultaneously with the previously described processing, in item 164, the methods detect edges of features within the continuous tone image (to identify edge pixels of the edge features using the image processor). In item 166, these methods add such edge pixels to the reduced-toner halftone image to produce a print-ready halftone image using an image processor. The non-printing pixels (holes) are not substituted for the edge pixels in item 162, so the edge pixels remain unaffected and unaltered by the substituted (added) holes in the print-ready halftone image, again to maintain image quality of the edges of features. Finally, in item 168, such methods print the print-ready halftone image on print media using a printing device.

As would be understood by one ordinarily skilled in the art, the processes described herein cannot be performed by a human alone (or one operating with a pen and a pad of paper) and instead such processes can only be performed by a machine (especially when the volume of image data being processed, and the speed at which such data needs to be processed is considered). For example, if one were to manually attempt to perform the pixel-by-pixel halftoning, masking, combining/comparing bitmaps, masking, etc., discussed above, the manual process would be sufficiently inaccurate and take an excessive amount of time to render the manual results useless. Specifically, processes such as receiving electronic image streams, halftoning contone images, applying masks to such data, etc., requires the utilization of different specialized machines, and humans performing such processing would not produce useful results because of the time lag, inconsistency, and inaccuracy humans would introduce into the results.

Further, such machine-only processes are not mere "post-solution activity" because the processing of contone image data to halftone images, and the process of printing using toner on paper can only be realistically performed by machines, and the described machines are integral with the process performed by the methods herein, and are not mere post-solution activity. In other words, these various machines are integral with the methods herein because the methods cannot be performed without the machines (and cannot be performed by humans alone).

Additionally, the methods herein solve many highly complex technological problems relating to reducing the number of pixels within electronic data bitmaps that will use toner internally within modern printing machines. For example, as mentioned above, toner saver methods can have a significant effect on image quality, and there can be a tradeoff between image quality and toner savings in conventional systems as the electronic data bitmaps are altered to decrease toner usage. Methods herein solve this technological problem by using multiple threshold arrays in combination with a toner reduction mask to properly identify holes, while at the same time adding edge pixels to the print-ready halftone electronic data image. This increases image quality, while reducing the amount of toner the printing engines use. By granting such benefits to machines and users, the methods herein reduce the marking material that is used, without affecting image quality, thereby solving a substantial technological problem that is experienced today.

Figure 3:
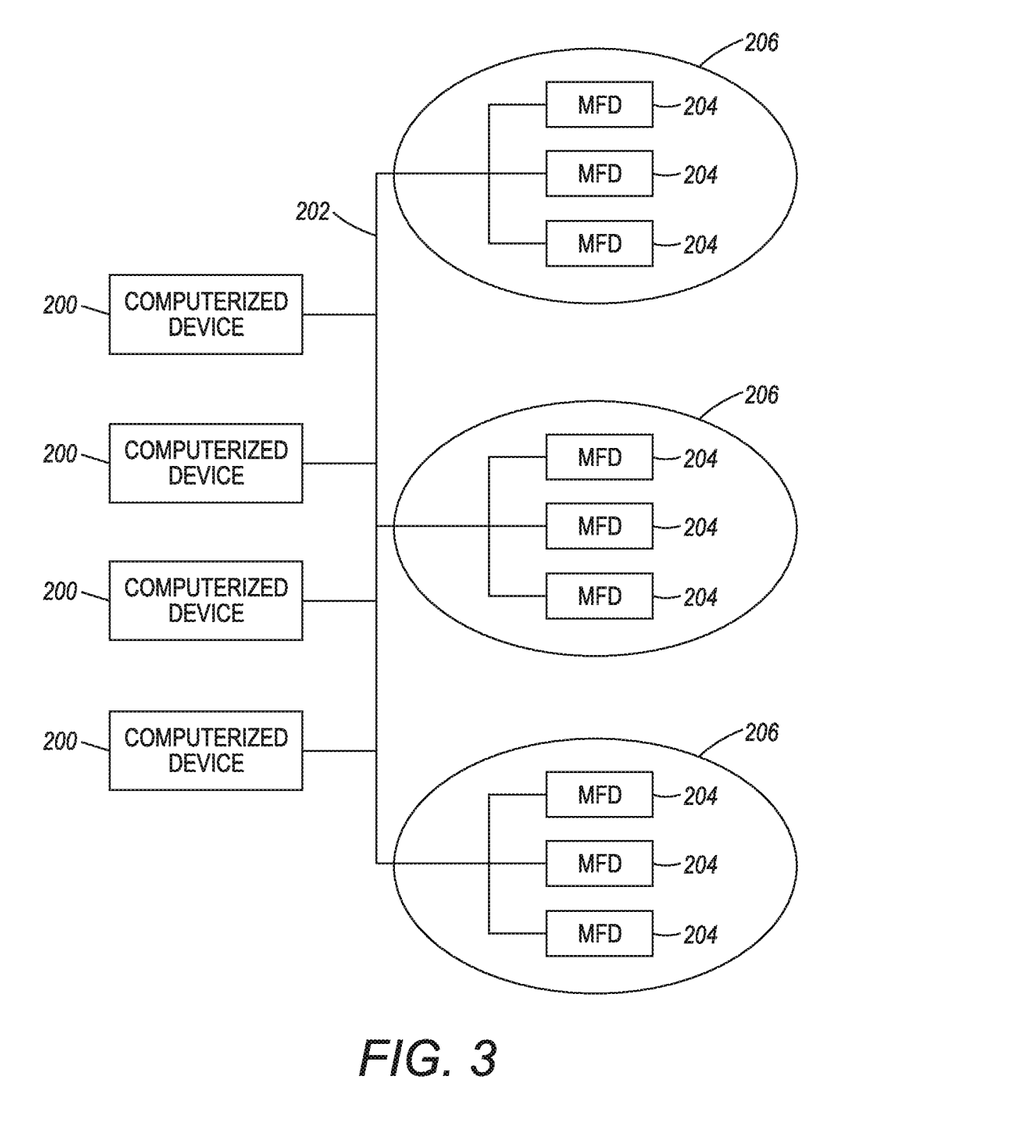
FIG. 3 is a schematic diagram illustrating systems herein.

As shown in FIG. 3, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 4:
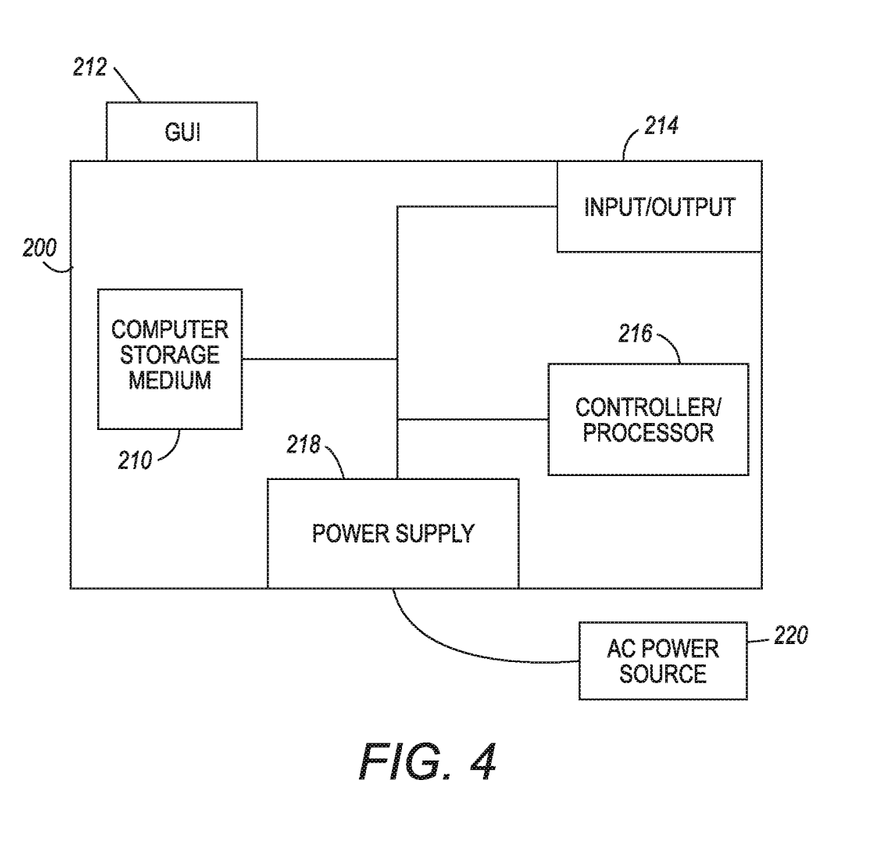
FIG. 4 is a schematic diagram illustrating devices herein.

FIG. 4 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 4, a body housing has one or more functional components that operate on power supplied from an alternating current (AC) source 220 by the power supply 218. The power supply 218 can comprise a common power conversion unit, power storage element (e.g., a battery, etc), etc.

Figure 5:
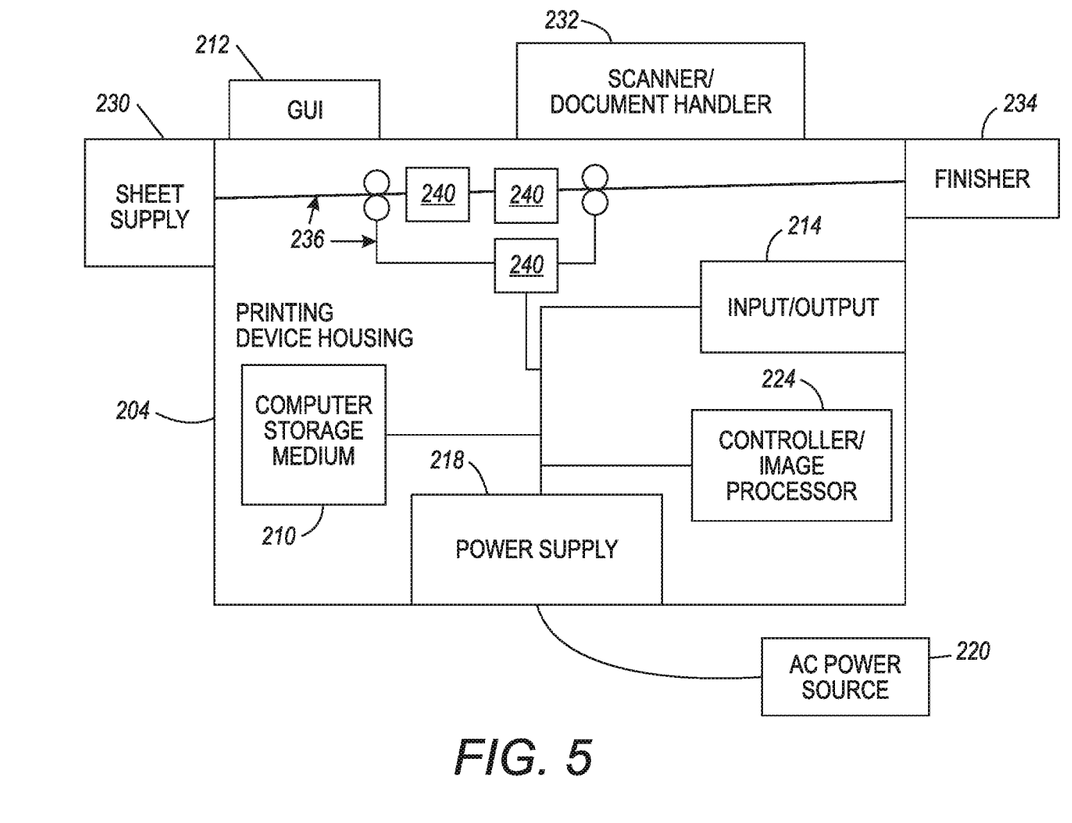
FIG. 5 is a schematic diagram illustrating devices herein.

FIG. 5 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Therefore, various printing devices herein include (among other components) an input 214 receiving a continuous tone image, an image processor 224 electrically connected to the input 214, a printing engine 240 electrically connected to the image processor 224, etc. The image processor 224 creates a first halftone image by applying a first threshold array to the continuous tone image, and simultaneously creates a second halftone image by applying a second threshold array to the continuous tone image. The first threshold array is different from the second threshold array, and the second threshold array can comprise an inverted form of the first threshold array (e.g., a horizontally or vertically flipped version of the first threshold array).

The image processor 224 also produces a third halftone image by identifying common printing pixels that are common to both the first halftone image and the second halftone image, and including only the common pixels in the third halftone image. The image processor 224 then applies a toner reduction mask to the third halftone image to remove a portion of the common pixels from the third halftone image to produce a fourth halftone image using the image processor 224. The fourth halftone image has only non-printing pixels (holes) and remaining ones of the common pixels that are not filtered out by the toner reduction mask. The image processor 224 also substitutes the non-printing pixels (holes) for printing pixels in the first halftone image to create a reduced-toner halftone image.

Simultaneously, the image processor 224 detects edges of features within the continuous tone image to identify edge pixels of the edge features. The image processor 224 then adds the edge pixels to the reduced-toner halftone image to produce a print-ready halftone image. Note that the non-printing pixels (holes) are not substituted for the edge pixels during the process of substituting to maintain high image quality edges. Finally, the printing engine 240 prints the print-ready halftone image on print media.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand. A print job includes a set of data that is to be printed, and can include images, graphics, and text from a variety of formats. In addition to the print data that will actually be printed on the print media, the print job also includes various commands controlling the printing; and such commands identify the printer to be used, the resolution of printing, the media type and size to be used, color characteristics, gloss characteristics, finishing operations to be performed, destinations of the printed pages, etc. A raster image processor (RIP) is a component used in a printing system that produces a raster image also known as a bitmap from the print job. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices that can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning refers to a process of representing a contone image as a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink).

Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing device comprising:
an input receiving a continuous tone image;
an image processor electrically connected to said input; and
a printing engine electrically connected to said image processor,
said image processor creating a first halftone image from said continuous tone image,
said image processor creating a second halftone image from said continuous tone image,
said image processor producing a third halftone image comprising common pixels that are common to both said first halftone image and said second halftone image,
said image processor applying a toner reduction mask to said third halftone image by removing a portion of said common pixels from said third halftone image according to said toner reduction mask to produce a fourth halftone image, said fourth halftone image having only non-printing pixels and remaining ones of said common pixels,
said image processor substituting said non-printing pixels for printing pixels in said first halftone image to create a reduced-toner halftone image,
said image processor detecting edges of features within said continuous tone image to identify edge pixels of said features,
said image processor adding said edge pixels to said reduced-toner halftone image to produce a print-ready halftone image, and
said printing engine printing said print-ready halftone image on print media.

2. The printing device of claim 1, said image processor creating said first halftone image by applying a first threshold array to said continuous tone image,
said image processor creating said second halftone image by applying a second threshold array to said continuous tone image, and
said second threshold array comprising an inverted form of said first threshold array.

3. The printing device of claim 2, said second threshold array comprising a horizontally or vertically flipped version of said first threshold array.

4. The printing device of claim 1, said non-printing pixels are not substituted for said edge pixels during said substituting.

5. The printing device of claim 1, said common pixels comprising printing pixels.

6. A printing device comprising:
an input receiving a continuous tone image;
an image processor electrically connected to said input; and
a printing engine electrically connected to said image processor,
said image processor creating a first halftone image by applying a first threshold array to said continuous tone image,
said image processor creating a second halftone image by applying a second threshold array to said continuous tone image,
said image processor producing a third halftone image by identifying common pixels that are common to both said first halftone image and said second halftone image, and including only said common pixels in said third halftone image,
said image processor applying a toner reduction mask to said third halftone image to remove a portion of said common pixels from said third halftone image to produce a fourth halftone image using said image processor, said fourth halftone image having only non-printing pixels and remaining ones of said common pixels,
said image processor substituting said non-printing pixels for printing pixels in said first halftone image to create a reduced-toner halftone image,
said image processor detecting edges of features within said continuous tone image to identify edge pixels of said features,
said image processor adding said edge pixels to said reduced-toner halftone image to produce a print-ready halftone image, and
said printing engine printing said print-ready halftone image on print media.

7. The printing device of claim 6, said second threshold array comprising an inverted form of said first threshold array.

8. The printing device of claim 6, said second threshold array comprising a horizontally or vertically flipped version of said first threshold array.

9. The printing device of claim 6, said non-printing pixels are not substituted for said edge pixels during said substituting.

10. The printing device of claim 6, said common pixels comprising printing pixels.

11. A method comprising:
creating a first halftone image from a continuous tone image using an image processor;
creating a second halftone image from said continuous tone image using said image processor;
producing a third halftone image using said image processor, said third halftone image comprising only common pixels that are common to both said first halftone image and said second halftone image;
applying a toner reduction mask to said third halftone image to remove a portion of said common pixels from said third halftone image to produce a fourth halftone image using said image processor, said fourth halftone image having only non-printing pixels and remaining ones of said common pixels;

substituting said non-printing pixels for printing pixels in said first halftone image to create a reduced-toner halftone image using said image processor;

detecting edges of features within said continuous tone image to identify edge pixels of said features using said image processor;

adding said edge pixels to said reduced-toner halftone image to produce a print-ready halftone image using said image processor; and printing said print-ready halftone image on print media using a printing device.

12. The method of claim 11, said first halftone image being created by applying a first threshold array to said continuous tone image, said second halftone image being created by applying a second threshold array to said continuous tone image, and said second threshold array comprising an inverted form of said first threshold array.

13. The method of claim 12, said first halftone image being created by applying a first threshold array to said continuous tone image, said second halftone image being created by applying a second threshold array to said continuous tone image, and said second threshold array comprising a horizontally or vertically flipped version of said first threshold array.

14. The method of claim 11, said non-printing pixels are not substituted for said edge pixels.

15. The method of claim 11, said common pixels comprising printing pixels.

16. A method comprising:

creating a first halftone image by applying a first threshold array to a continuous tone image using an image processor;

creating a second halftone image by applying a second threshold array to said continuous tone image using said image processor;

producing a third halftone image using said image processor by identifying common pixels that are common to both said first halftone image and said second halftone image, and including only said common pixels in said third halftone image;

applying a toner reduction mask to said third halftone image by removing a portion of said common pixels from said third halftone image according to said toner reduction mask to produce a fourth halftone image using said image processor, said fourth halftone image having only non-printing pixels and remaining ones of said common pixels;

substituting said non-printing pixels for printing pixels in said first halftone image to create a reduced-toner halftone image using said image processor;

detecting edges of features within said continuous tone image to identify edge pixels of said features using said image processor;

adding said edge pixels to said reduced-toner halftone image to produce a print-ready halftone image using said image processor; and printing said print-ready halftone image on print media using a printing device.

17. The method of claim 16, said second threshold array comprising an inverted form of said first threshold array.

18. The method of claim 16, said second threshold array comprising a horizontally or vertically flipped version of said first threshold array.

19. The method of claim 16, said non-printing pixels are not substituted for said edge pixels.

20. The method of claim 16, said common pixels comprising printing pixels.

* * * * *